United States Patent
Hou et al.

(10) Patent No.: US 7,155,686 B2
(45) Date of Patent: Dec. 26, 2006

(54) PLACEMENT AND ROUTING METHOD TO REDUCE JOULE HEATING

(75) Inventors: Chin-Shan Hou, Hsin-Chu (TW); Tong-Chern Ong, Chong Her (TW); Jui-Ling Yang, Hsin-Chu (TW); Jun-Yi Wu, Hsin-Chu (TW)

(73) Assignee: Taiwan Semiconductor Manufacturing Co., Ltd., Hsinchu (TW)

( * ) Notice: Subject to any disclaimer, the term of this patent is extended or adjusted under 35 U.S.C. 154(b) by 359 days.

(21) Appl. No.: 10/796,430

(22) Filed: Mar. 9, 2004

(65) Prior Publication Data

US 2005/0204314 A1 Sep. 15, 2005

(51) Int. Cl.
*G06F 17/50* (2006.01)
(52) U.S. Cl. .................. 716/2; 716/4; 716/13
(58) Field of Classification Search ............ 716/2, 716/4, 9, 12, 13
See application file for complete search history.

(56) References Cited

U.S. PATENT DOCUMENTS

| | | | |
|---|---|---|---|
| 5,510,293 A | 4/1996 | Numata | 437/195 |
| 5,811,352 A | 9/1998 | Numata et al. | 438/622 |
| 5,858,869 A | 1/1999 | Chen et al. | 438/597 |
| 6,265,308 B1 | 7/2001 | Bronner et al. | 438/637 |
| 6,532,570 B1* | 3/2003 | Mau | 716/2 |
| 6,604,228 B1* | 8/2003 | Patel et al. | 716/8 |
| 6,634,013 B1* | 10/2003 | Shinzawa | 716/5 |
| 6,816,995 B1* | 11/2004 | Yokogawa | 716/1 |
| 6,857,113 B1* | 2/2005 | Gentry et al. | 716/5 |

* cited by examiner

Primary Examiner—A. M. Thompson
Assistant Examiner—Magid Y. Dimyan
(74) Attorney, Agent, or Firm—Thomas, Kayden, Horstemeyer & Risley

(57) ABSTRACT

A new method to optimize a signal routing in an integrated circuit is achieved. The method comprises providing a signal routing in an integrated circuit layout. The signal routing comprises a configuration of metal lines in a stack of metal levels. Each metal level is separated from an underlying substrate by dielectric material. A Joule heating estimate is calculated for the signal routing. The Joule heating estimate is compared to a standard value. The signal routing is updated if the Joule heating estimate exceeds the standard value. The updating comprises generating a new configuration of the metal lines in the metal levels. The new configuration reduces the Joule heating. The steps of calculating, comparing, and updating are repeated if the Joule heating estimate still exceeds the standard value. Joule heating is reduced by either routing on lower metal levels or by coupling the signal routing to a heat sink.

21 Claims, 9 Drawing Sheets

$$J_{rms} = \left[ \left( \int^\tau J^2(t)\, dt \right) / \tau \right]^{1/2}$$

PLACEMENT AND ROUTING METHOD TO REDUCE JOULE HEATING

BACKGROUND OF THE INVENTION (1) Field of the Invention

The invention relates to a method to reduce Joule heating in an integrated circuit device, and, more particularly, to a method to detect Joule heating problems in signal routes and to eliminate these problems through re-routing or through a heat sink.

(2) Description of the Prior Art

Integrated circuit devices typically contain a large number of signal wires, or lines. These signal lines are formed in a conductive layer such as a metal film. Individual signal lines are separated using dielectric films. The combination of signal lines and dielectric films creates a set of interconnect levels for an integrated circuit device. It is common for an integrated circuit device to use eight or more levels of interconnect formed in a stack and using via openings to allow connection between adjacent levels.

Referring now to FIG. 1, a simplified cross section of an integrated circuit device is shown. The cross section shows a substrate 10, a metal line 18, a first dielectric layer 14 between the metal line 18 and the substrate 10, and a second dielectric layer 22 overlying the metal line 18. Voltages and currents are transmitted by the signal line 18. In this example, the metal line 18 carries a current, $I_{LINE}$. Typically, the metal line 18 comprises a low resistivity material such as aluminum or copper to minimize the resistance of the line, $R_{LINE}$. In the DC case, the heat lost by the metal line 18 is given by:

$$HEAT = I^2_{LINE} \times R_{LINE}.$$

However, many signals in IC devices are AC in nature. In an AC signal, the line current $I_{LINE}$ will flow in two directions. Further, these AC signals may comprise very high frequencies, such as in the case of clock signals. These high frequency signals transmitted in metal lines 18 can generate a significant amount of heat. This heat will be transferred through the dielectric layers 22 and 14. Some of the heat will be transferred through the second dielectric layer 22 to any overlying films or packaging. Some of the heat will be transferred through the first dielectric layer 14 to the underlying substrate. If the heat generated in the metal lines 18 exceeds the heat transferred away from the metal lines 18, then the metal lines will increase in temperature. This phenomenon is called Joule heating.

Referring now to FIG. 2, the Joule heating concept is further illustrated. It is known that the ability of a conductor to carry current is proportional to the cross sectional area of the conductor. Therefore, the line current (A) may be divided by the line cross section (cm$^2$) to derive the current density J (A/cm$^2$) for the signal line. An exemplary current density J(t) 70 is shown for an AC signal in an integrated circuit device. In this case, the signal is periodic with a frequency of 1/τ Hz. It is known that the Joule heating generated by a conductive line is proportional to the square of the root mean square (RMS) of the current density, or $J_{RMS}$. For a periodic signal having J(t), $J_{RMS}$ is given by:

$$J_{RMS} = \left[ \left( \int_0^\tau J^2(t)\,dt \right) / \tau \right]^{1/2}.$$

It is important to note that Joule heating occurs regardless of the direction of the current. This is why the RMS value of current density must be determined.

Referring again to FIG. 1, the current density in the signal line 18 generates heat. The extent to which the signal line increases in temperature due to this heating further depends on the heat transfer paths. Typically, the heat is not efficiently transferred above the metal lines 18 because the overlying materials are not primarily good thermal conductors. Therefore, most of the heat will be transferred through the first dielectric layer 14 to the underlying substrate 10. The relationship between the current density, the dielectric layer 14, and the Joule heating is given by:

$$J_{RMS}^2 \alpha \Delta T\, k_{IMD}/t_{IMD},$$

where $\Delta T$ is the temperature rise with respect to the substrate 10, or Joule heating, in the metal line 18, $k_{IMD}$ is the thermal conductivity of the dielectric layer 14, and $t_{IMD}$ is the thickness of the dielectric layer 14.

The Joule heating in a signal line is important because of reliability concerns. As stated above, the signal line will increase in temperature $\Delta T$ if the heat generated in the signal line exceeds the heat transferred out of the signal line. If the signal line temperature becomes excessive, the metal line or the dielectric layers can be stressed to the point of failure. Typically, a maximum allowed temperature difference, $\Delta T_{MAX}$, is specified for the integrated circuit technology. For example, the $\Delta T_{MAX}$ for a multiple metal level device may be about 15 degrees C. as an industry convention.

Another phenomenon that causes reliability concern for conductive lines is electromigration. Electromigration is a diffusion of metal material in a signal line caused by excessive current density. Electromigration causes the metal atoms to literally move in the direction of electron flow if an excessive current density situation persists. Electromigration can cause a metal line to become open circuits. Unlike Joule heating, however, electromigration is a directional phenomenon. That is, current flow in a first direction causes electromigration in the same direction. Meanwhile, current flow in an opposite direction causes electromigration in the opposite direction. Referring again to FIG. 2, as a result, positive current density J(t) 71 and negative current density J(t) 72 causes a significant cancellation of electromigration in the conductive line. However, as discussed above, Joule heating will occur regardless of the current direction and is not canceled by the AC current action.

In a typical IC process, the maximum allowed current density, $J_{MAX}$, is determined by the electromigration effect. Layout design rules are established to prevent electromigration using this $J_{MAX}$ limit. However, to insure reliability, it is important that the Joule heating phenomenon also be considered in the layout of the device.

Several prior art inventions relate to Joule heating in metal lines in an integrated circuit device. U.S. Pat. No. 5,811,352 to Numata et al describes a method to reduce Joule heating in metal lines. Dummy metal lines are added to an IC layout. The dummy lines do not conduct current and are not connected to the signal path. However, the dummy lines are formed in close proximity to the signal metal lines to improve thermal dissipation. U.S. Pat. No. 5,510,293 to Numata discloses a method to reduce Joule heating in metal lines. A thermo-conductive dielectric layer, such as AlN, is deposited overlying metal lines while a low k-value dielectric material is formed between the metal lines. U.S. Pat. No. 5,858,869 to Chen et al teaches a method to form an intermetal dielectric layer with improved Joule heating performance. A thin, anisotropic plasma oxide is formed overlying metal lines. A low k-value dielectric material is then conformally deposited and polished down. A fluorinated silicate glass (FSG) layer is then deposited overlying the low-k material and the metal lines. U.S. Pat. No. 6,265,308 B1 to Bronner et al describes a method to form damascene lines and vias.

SUMMARY OF THE INVENTION

A principal object of the present invention is to provide an effective method to reduce Joule heating problems in an integrated circuit device.

A further object of the present invention is to provide a method to detect Joule heating problems in metal signal lines and to correct problem routings.

A yet further object of the present invention is to correct signal routings by re-routing signals to a lower metal level.

A yet further object of the present invention is to correct signal routings by coupling the signal routing to a heat sink diffusion in the substrate.

A yet further object of the present invention is to correct signal routings by coupling the signal routing to a heat sink comprising a set of metal lines connected together by vias to create a large thermal mass.

A yet further object of the present invention is to facilitate the use of copper and low k-value dielectric material.

A yet further object of the present invention is to eliminate Joule heating problems without requiring larger metal line widths.

Another further object of the present invention is to provide a signal routing structure having improved Joule heating performance.

A yet further object of the present invention is to provide a heat sink structure to reduce Joule heating.

In accordance with the objects of this invention, a method to optimize a signal routing in an integrated circuit is achieved. The method comprises providing a signal routing in an integrated circuit layout. The signal routing comprises a configuration of metal lines in a stack of metal levels. Each metal level is separated from an underlying substrate by dielectric material. A Joule heating estimate is calculated for the signal routing. The Joule heating estimate is compared to a standard value. The signal routing is updated if the Joule heating estimate exceeds the standard value. The updating comprises generating a new configuration of the metal lines in the metal levels. The new configuration reduces the Joule heating. The steps of calculating, comparing, and updating are repeated if the Joule heating estimate still exceeds the standard value.

Also in accordance with the objects of this invention, a signal routing structure in an integrated circuit is achieved. The structure comprises a set of metal lines in a stack of metal levels. Each metal level is separated from an underlying substrate by dielectric material. A heat sink is coupled to the set of metal lines.

BRIEF DESCRIPTION OF THE DRAWINGS

In the accompanying drawings forming a material part of this description, there is shown.

DESCRIPTION OF THE PREFERRED EMBODIMENTS

The preferred embodiments of the present invention disclose a method to prevent Joule heating reliability failures in an integrated circuit device. The method detects signal routings where excessive Joule heating could occur. These signals are re-routed to reduce the Joule heating. The re-routing comprises either moving part of the signal path to a lower metal level or coupling the signal routing to a heat sink. It should be clear to those experienced in the art that the present invention can be applied and extended without deviating from the scope of the present invention.

Figure 1:
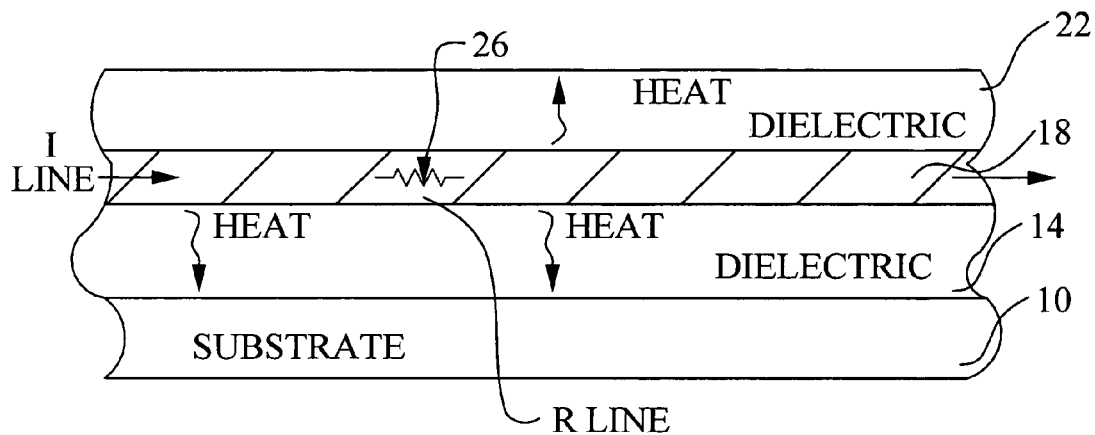
FIG. 1 illustrates the Joule heating effect in a metal film layer.
Figure 2:
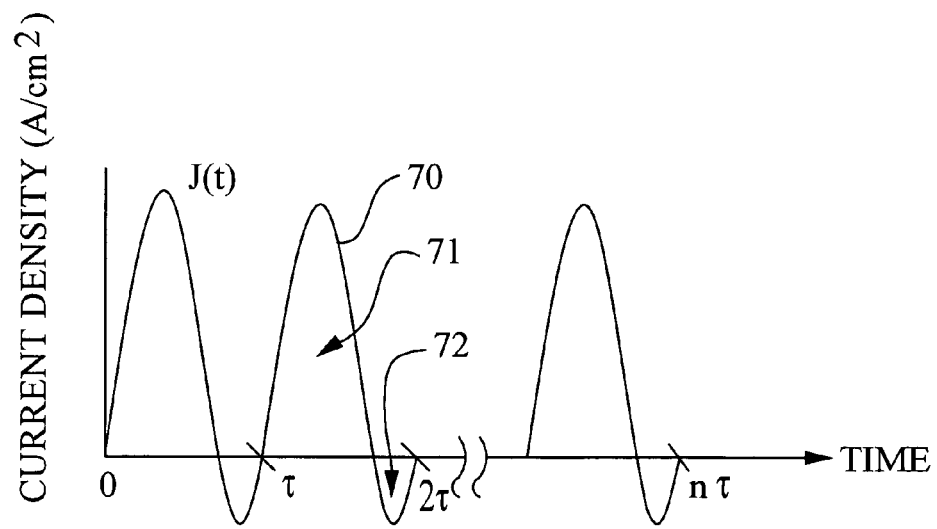
FIG. 2 illustrates Joule heating as a root mean square (RMS) of the current density in a signal line.
Figure 3:
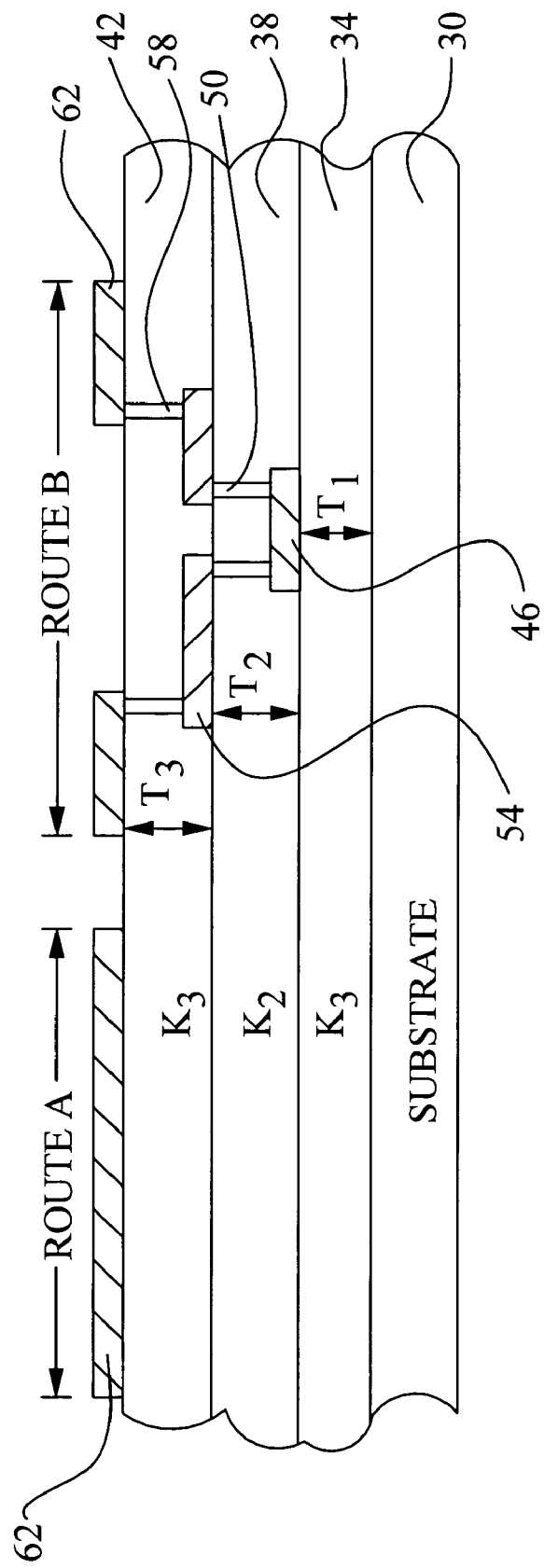
FIG. 3 illustrates the effect of substrate proximity in Joule heating of a metal signal routing.

Referring now to FIG. 3, a simplified cross section of an integrated circuit device is illustrated. The device comprises a substrate 30 as is typical to the art. Three metal layers 46, 54, and 62 are formed overlying the substrate 30. Three dielectric layers 34, 38, and 42 are formed overlying the substrate and serve to separate the three metal layers 46, 54, and 62. Further, vias 50 and 58 are formed in the dielectric layers 38 and 42. These vias allows metal levels to be coupled together. For example, vias 58 in the third dielectric layer 42 allow the second metal layer 54 to be coupled to the third metal layer 62. This arrangement of a hierarchy of metal layers and dielectric layers to form levels of connective lines is well known in the art.

In the cross section, two signal routings are shown: ROUTE A, and ROUTE B. ROUTE A comprises a signal line routed entirely in the third level of metal 62. ROUTE B comprises a signal line of similar length that is routed, in part, in each of the metal levels 46, 54, and 62. Several observations can be made regarding the two routings. First, ROUTE A is the simplest routing to manufacture since no vias are used. Second, all of the ROUTE A metal line overlies a stack of three dielectric layers 34, 38, and 42. Therefore, ROUTE A is separated from the underlying substrate 30 by the combined thickness of the dielectric layers 34, 38, and 42. The distance between ROUTE A and the underlying substrate 30 is $T_1+T_2+T_3$, where $T_1$ is the thickness of the first dielectric layer 34, $T_2$ is the thickness of the second dielectric layer 38, and $T_3$ is the thickness of the third dielectric layer 42.

Third, ROUTE B is, on average, closer to the underlying substrate 30. The closest section 46 of ROUTE B is only separated from the substrate 30 by the first dielectric layer 34 having a thickness of $T_1$. Another section 54 of ROUTE B is separated from the substrate 30 by the combined thickness, $T_1+T_2$, of the first and second dielectric layers 34 and 38. Finally, a third section 62 of ROUTE B is separated from the substrate 30 by the combined thickness, $T_1+T_2+T_3$, of the first, second, and third dielectric layers 34, 38, and 42.

Recalling the analysis of the prior art, the relationship between Joule heating, current density, and the dielectric layer is given by:

$$J_{RMS}^2 \alpha \Delta T \, k_{IMD}/t_{IMD}.$$

Solving for temperature, the equation becomes:

$$\Delta T \alpha J_{RMS}^2 t_{IMD}/k_{IMD}.$$

The Joule heating for ROUTE A is proportionally given by:

$$\Delta T_A \alpha J_{RMSA}^2 t_{IMDA}/k_{IMDA}.$$

The Joule heating for ROUTE B is proportionally given by:

$$\Delta T_B \alpha J_{RMSB}^2 t_{IMDB}/k_{IMDB}.$$

Assuming that both routings have the same current density and that the dielectric 34, 38, and 42 have a common thermal conductivity, where $k_1=k_2=k_3$, then it can be concluded that the Joule heating for ROUTE B is less than that of ROUTE A as given by:

$$[\Delta T_A - \Delta T_B] \alpha [\text{average}(t_{IMDA}) - \text{average}(t_{IMDB})].$$

The average thickness of ROUTE A is $T_1+T_2+T_3$. If the average thickness is about $(T_1+T_2+T_3)/2$, then the ROUTE B should exhibit about half as much Joule heating as ROUTE A. From this analysis, it is clear that routing the signal in lower metal levels is a technique that can be used to reduce Joule heating.

Figure 8:
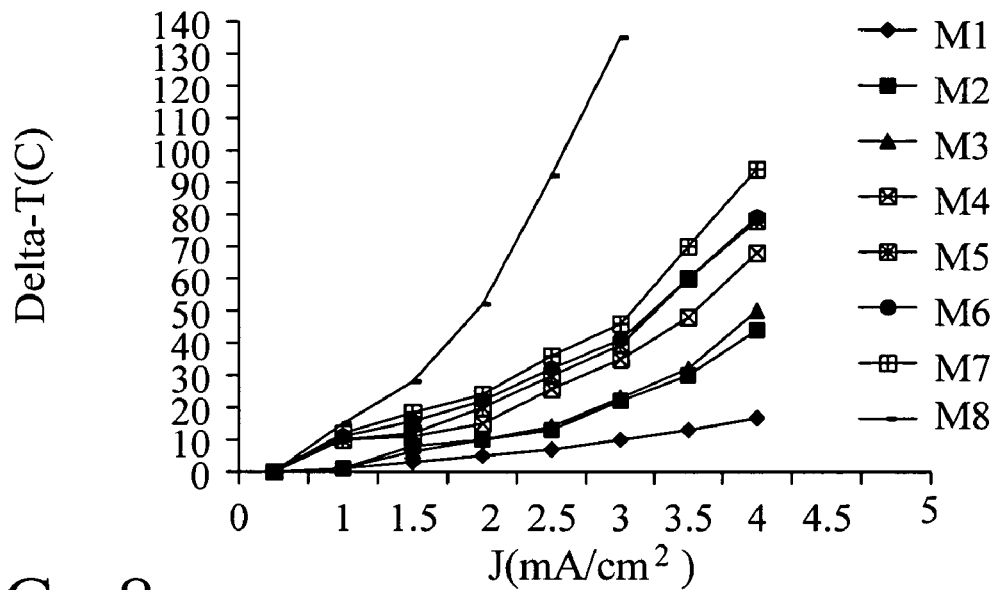
FIGS. 8 and 9 illustrate the Joule heating effect with respect to the metal level.
Figure 9:
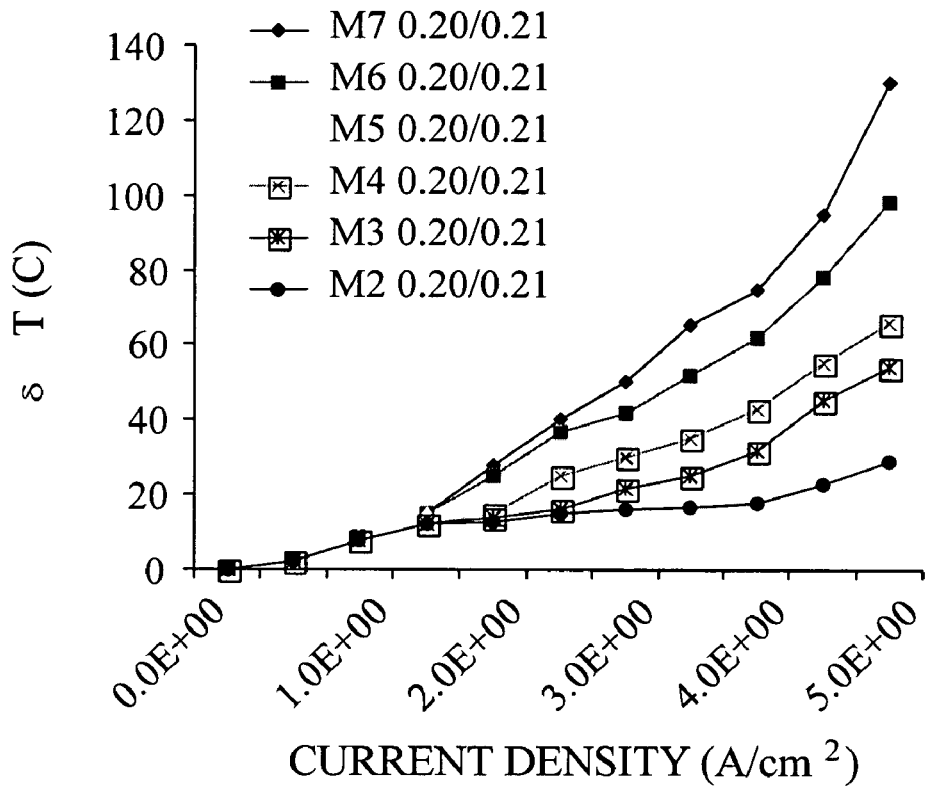

The above analysis is confirmed by empirical data and by simulation results in FIGS. 8 and 9, respectively. FIGS. 8 and 9 chart Joule heating (C) of metal lines at various current densities (MA/cm$^2$). It is found that the upper metal layers (i.e., M8, M7, M6) exhibit much higher Joule heating than the lower metal layers (i.e., M1, M2, M3) as expected.

Figures 4, 5:
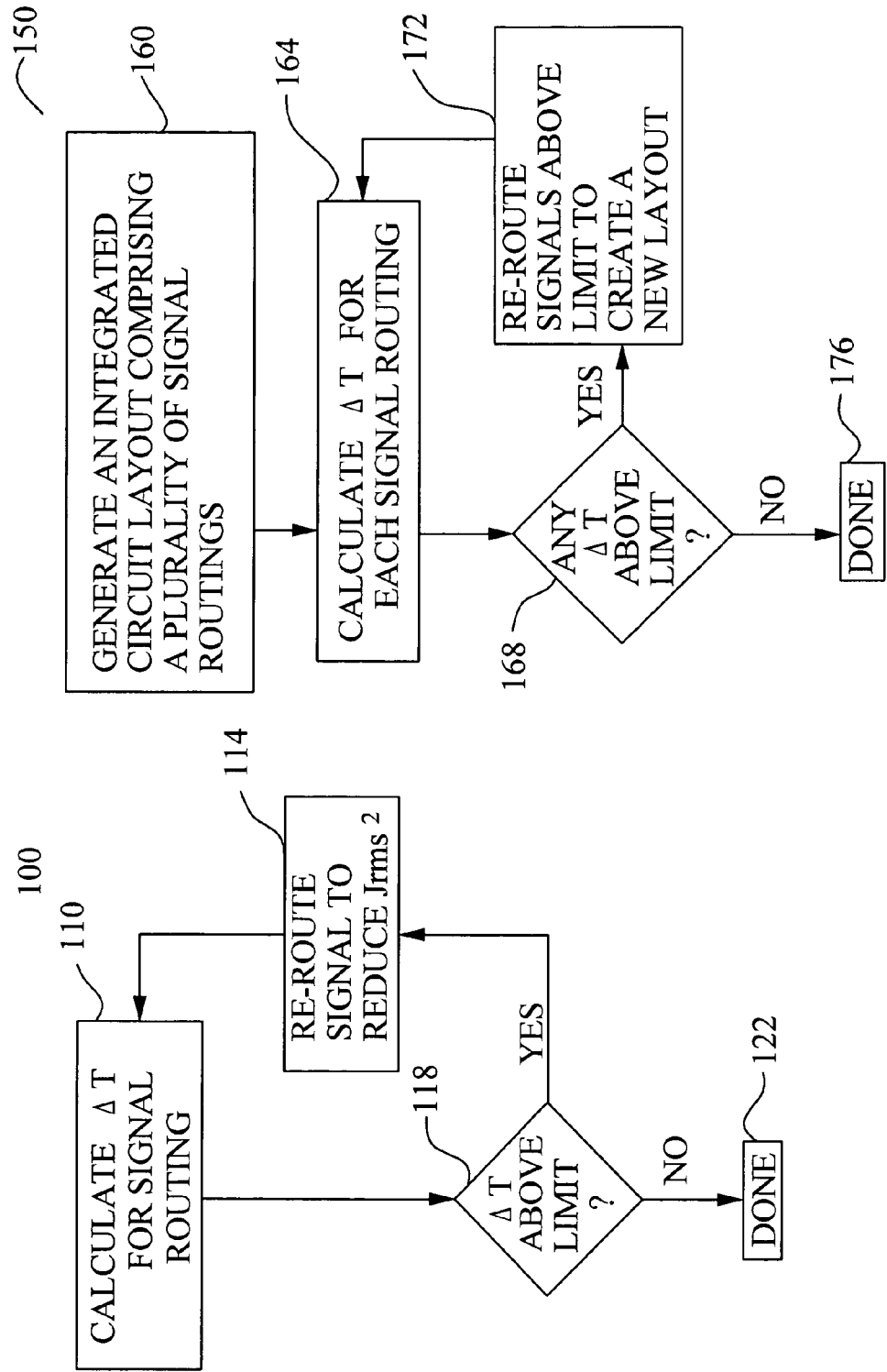
FIG. 4 illustrates a first preferred embodiment of the present invention showing a method to improve reliability in a signal routing.
FIG. 5 illustrates a second preferred embodiment of the present invention showing a method to improve reliability of an integrated circuit layout.

Referring now to FIG. 4, a first preferred embodiment of the present invention is illustrated. Several important features of the present invention are discussed below. The embodiment discloses a general method 100 to improve the reliability of a signal routing. The signal routing comprises a configuration of metal lines in a stack of metal levels in the circuit layout as is illustrated in FIG. 3. Each metal level is separated from an underlying substrate by dielectric material. Referring again to FIG. 4, as a first step in the method 100, a Joule heating ($\Delta T$) estimate is calculated for the signal routing in step 110. The Joule heating estimate is based on the layout information. The Joule heating estimate comprises calculating the current density in the metal lines in the signal routing. The Joule heating estimate is preferably based on the thickness of the dielectric layer and the thermal conductivity of the dielectric layer as described above.

After the Joule heating estimate is calculated, the estimate is then compared to a standard value in step 118. For example, a maximum temperature rise $\Delta T_{MAX}$ of about 15 degrees C. may be used as the standard Joule heating value. If the Joule heating estimate exceeds the standard value, then the signal routing is updated in step 114. If the estimate does not exceed the standard, then the signal routing passes the test to step 122. The updating of step 114 comprises generating a new configuration of the metal lines in the metal levels. This new configuration must first connect the signal into the integrated circuit design to fulfill the device schematic. Second, the new configuration reduces the Joule heating. The steps of calculating (step 110), comparing (step 118), and updating (114) are repeated until the Joule heating estimate passes the standard value test.

The present invention discloses two preferred means of reducing the Joule heating of a signal routing. First, the signal can be re-routed onto lower levels of metal. Second, a heat sink can be coupled to the signal routing.

Figure 6:
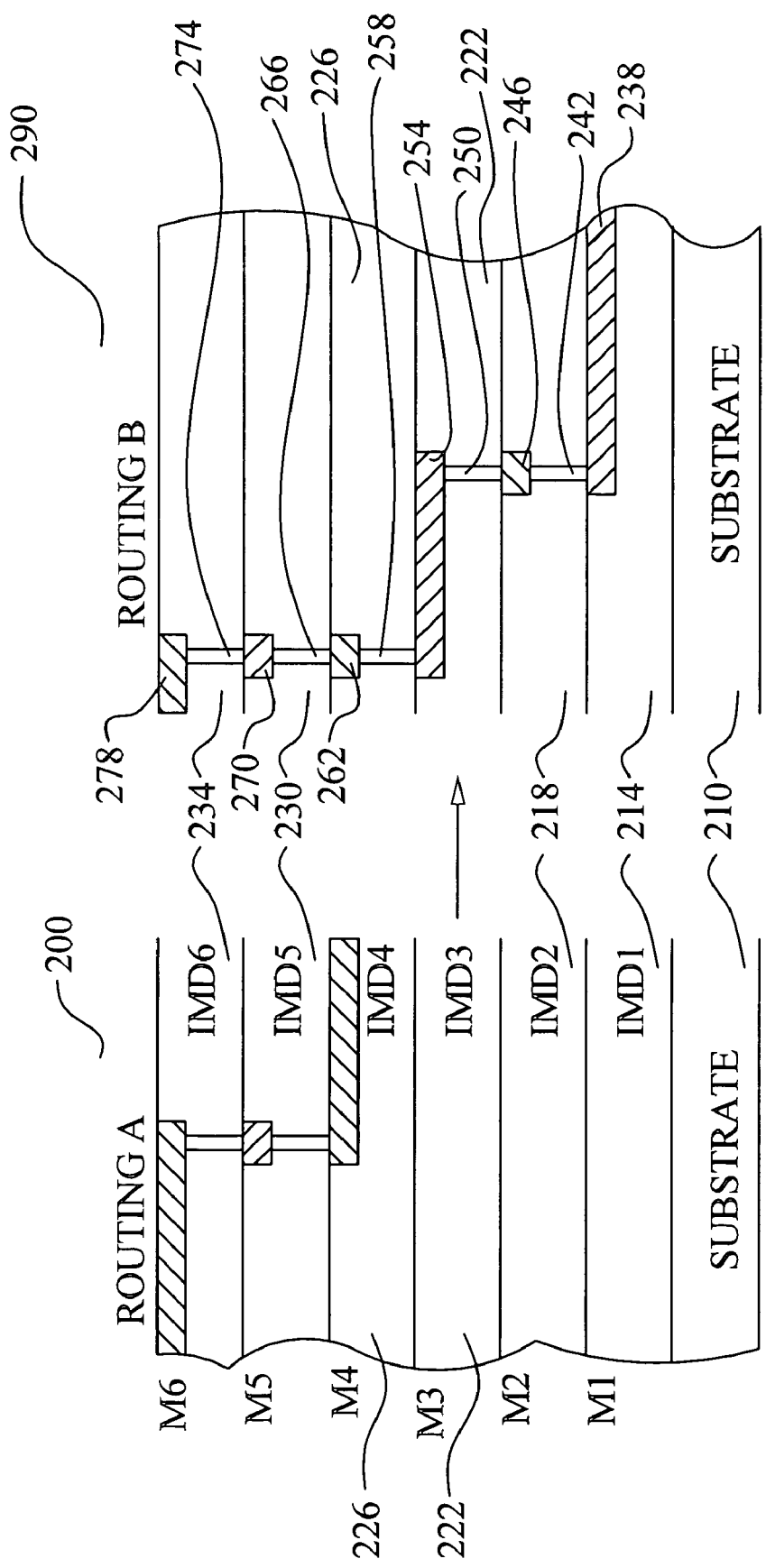
FIG. 6 illustrates a first preferred embodiment of the present invention showing the structure in a cross sectional view.

Referring now to FIG. 6, the first preferred method to reduce the Joule heating of a signal routing that exceeds the Joule heating limit is shown. In the illustration, cross sections of routings, ROUTING A and ROUTING B, are shown. Each cross section depicts an integrated circuit device comprising the same technology and interconnect levels. ROUTING A depicts a signal routing section comprising sub-sections in metal-6 (M6) 278, metal-5 (M5) 270, and metal-4 (M4) 262. In this case, ROUTING A is analyzed by the method 100 of the preferred embodiment as shown in FIG. 4. If ROUTING A is found to exceed the Joule heating upper limit, then the signal routing is updated by step 114. The updating step re-routes the signal path of the section to create an alternative routing called ROUTING B as shown in FIG. 6.

Referring again to FIG. 6, ROUTING B adds additional metal levels and vias to the signal path. The resulting routing comprises sections of metal-3 (M3) 254, metal-2 (M2) 246, and metal-1 (M1) 238 in addition to the upper metal levels 262, 270, and 278. As discussed above, the inclusion of lower metal levels reduces the distance between the signal line and the underlying substrate 210. As a result, the signal path is thermally coupled to the substrate in a more efficient arrangement. The Joule heating of the updated routing, ROUTING B, is therefore lower than that of the original routing, ROUTING A. Generically, the first preferred method of reducing the Joule heating of a given signal routing may comprise reducing the total volume of dielectric material between the metal lines and the substrate 210.

Figure 10:
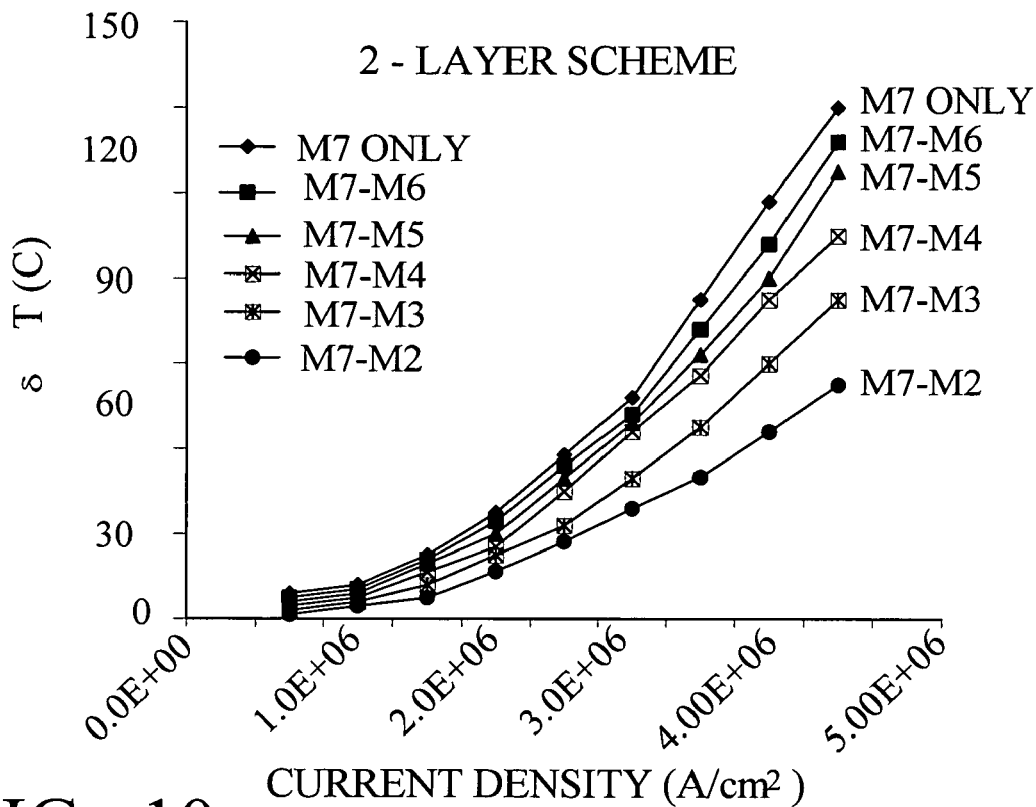
FIGS. 10 and 11 illustrate reduction in Joule heating achieved by routing a signal in a lower metal level.
Figure 11:
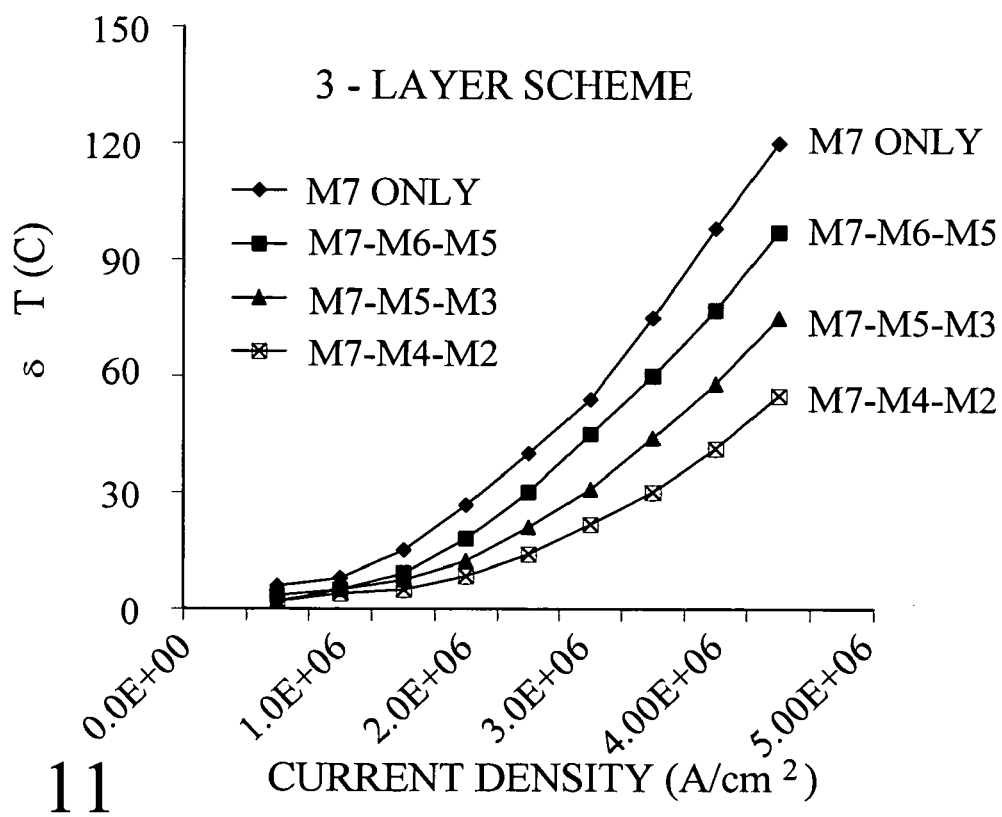

The first preferred method of reducing Joule heating is supported by empirical data as shown by FIGS. 10 and 11. In FIG. 10, a signal is routed in six different ways. First, the signal is routed in metal-7 (M7) only. Next, it is routed partially in M7 and partially in metal-6 (M6). Next, the signal is routed partially in M7 and partially in metal-5 (M5), and so on, until the signal is routed partially in M7 and partially in metal-2 (M2). The test structures are then subjected to a range of current density levels. Clearly, the inclusion of a section of a lower metal level reduces the Joule heating of the routing. In addition, the lower the metal level, the better the performance. Referring to FIG. 11, the concept is extended to a three-layer scheme where the signal is routed on two lower metal levels. Again, the inclusion of lower metal levels significantly improves the Joule heating performance.

Figure 7:
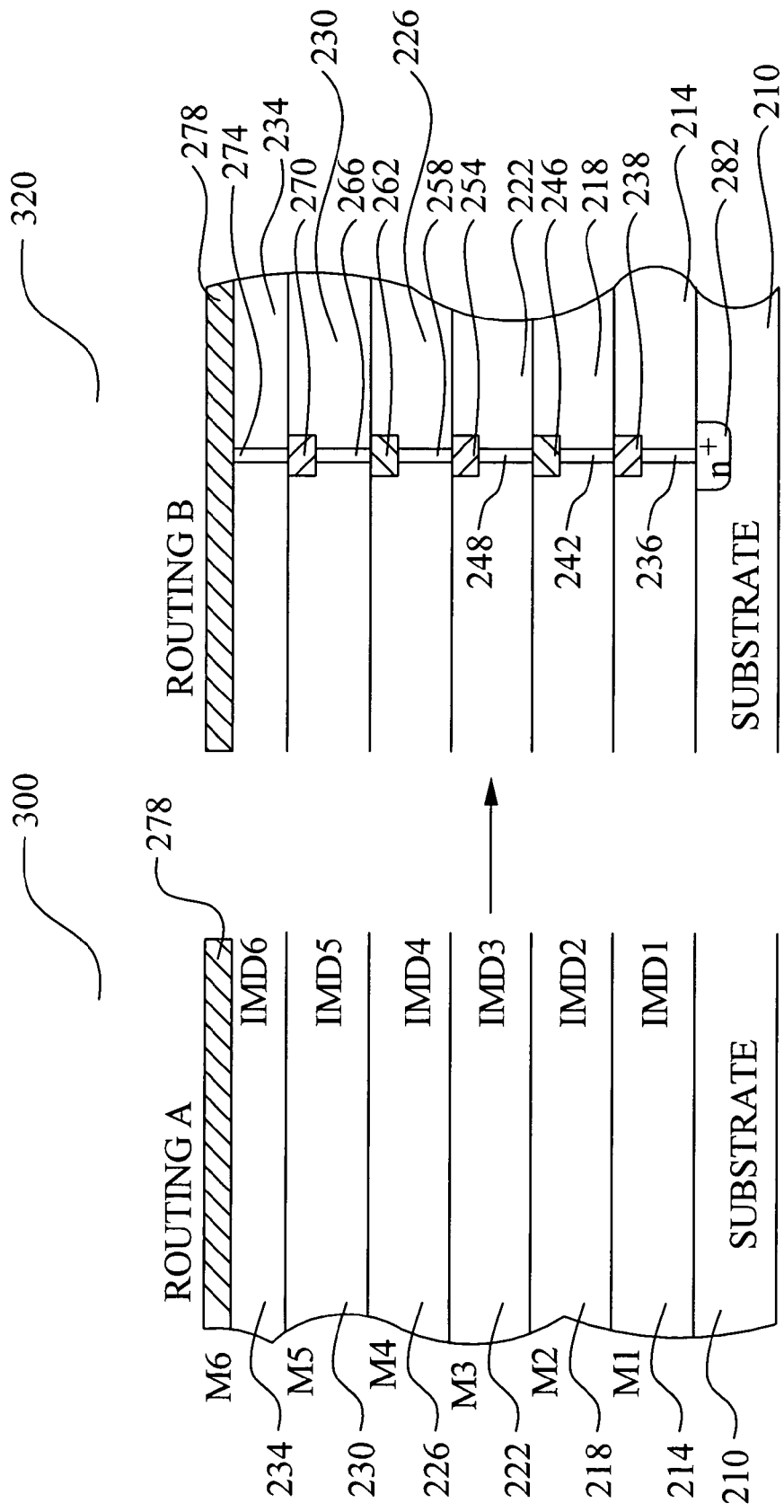
FIG. 7 illustrates a second preferred embodiment of the present invention showing the structure in a cross sectional view.
Figure 14:
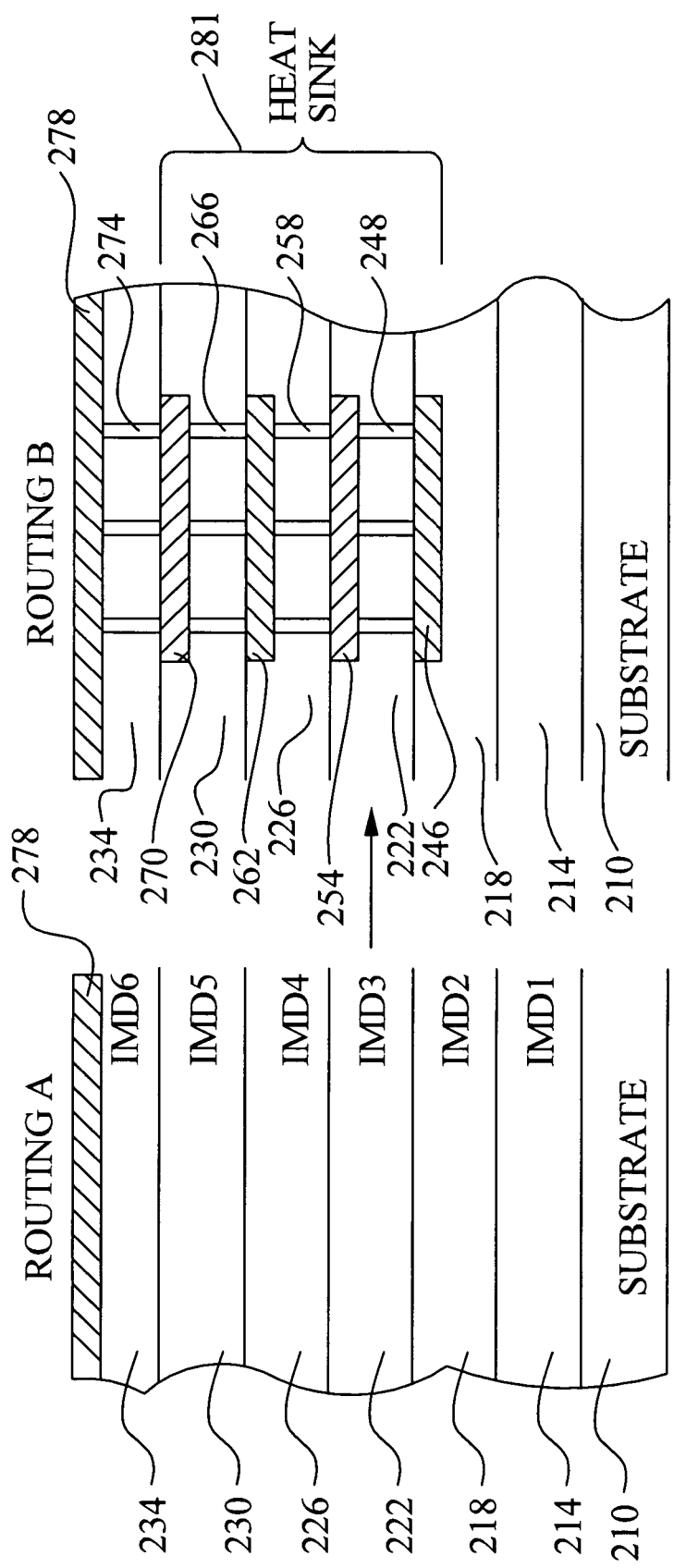
FIG. 14 illustrates reduction in Joule heating achieved by incorporating metal heat sinks into the signal routing.

A second preferred method of reducing the Joule heating of a routing is to couple the routing to a heat sink. Two types or heat sink structures are preferred. First, the heat sink may comprise a substrate diffusion region. This is illustrated in FIG. 7. Second, the heat sink may comprise a set of metal lines that are connected together to form a thermal mass as is shown in FIG. 14. Referring now to FIG. 7, the second preferred method is shown in cross section. Again a first routing, ROUTING A, is analyzed by the method of the present invention. If ROUTING A exceeds the Joule heating limit, an alternative routing, ROUTING B, is generated. In this case, the only change to generate ROUTING B from ROUTING A is to couple the signal routing 278 to the substrate 210. More particularly, metal levels M5 270, M4 262, M3 254, M2 246, and M1 238, and vias 274, 266, 258, 248, 242, and 236, are added to provide a downward coupling to a substrate diffusion region 282. The diffusion region 282 can be easily formed by known methods.

The diffusion region 282 preferably comprises a floating diffusion. That is, the diffusion region 282 is preferably formed such that it is not electrically coupled to the substrate for the voltage range of the signal line. For example, if the substrate 210 comprises p-type silicon that is tied to ground, then the floating diffusion 282 would comprise an n-type region in the silicon substrate 210 and the signal range would be from ground up to the system supply (VDD). In this configuration, the reverse biased p-n junction formed by the n+ diffusion region 282 and the p-type substrate 210 would be electrically a high resistance. However, the M6 signal line 278 would be thermally coupled to the substrate 210 through the heat sink diffusion 282. Alternatively, multiple heat sinks may be coupled to the signal routing.

Figure 12:
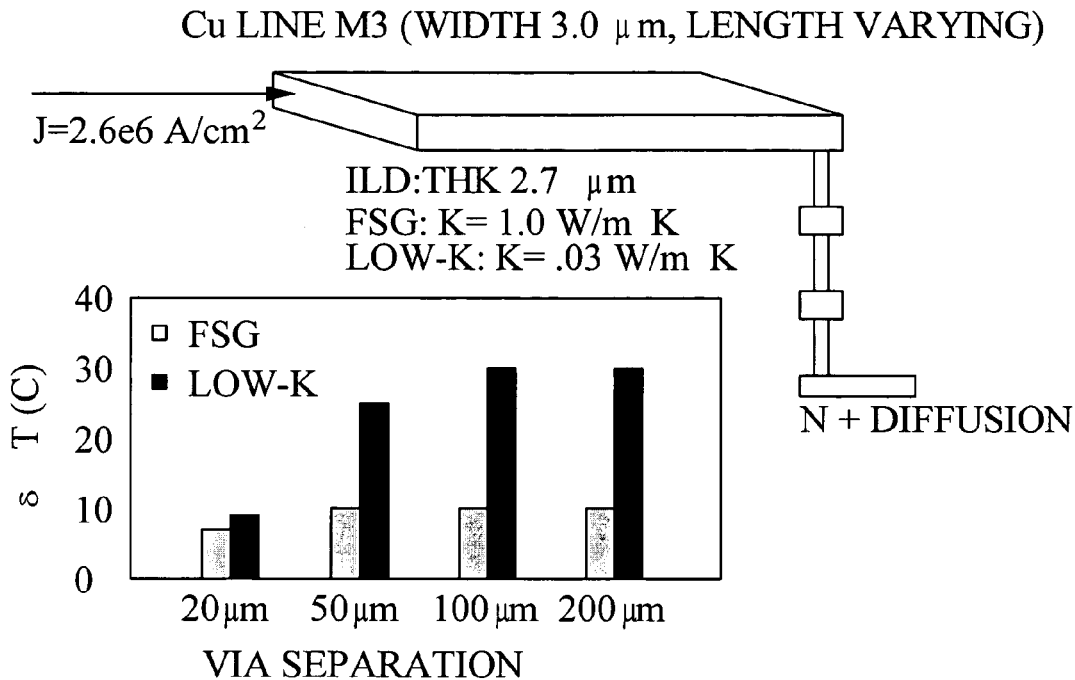
FIGS. 12 and 13 illustrate reduction in Joule heating achieved by incorporating substrate heat sinks into a signal routing.
Figure 13:
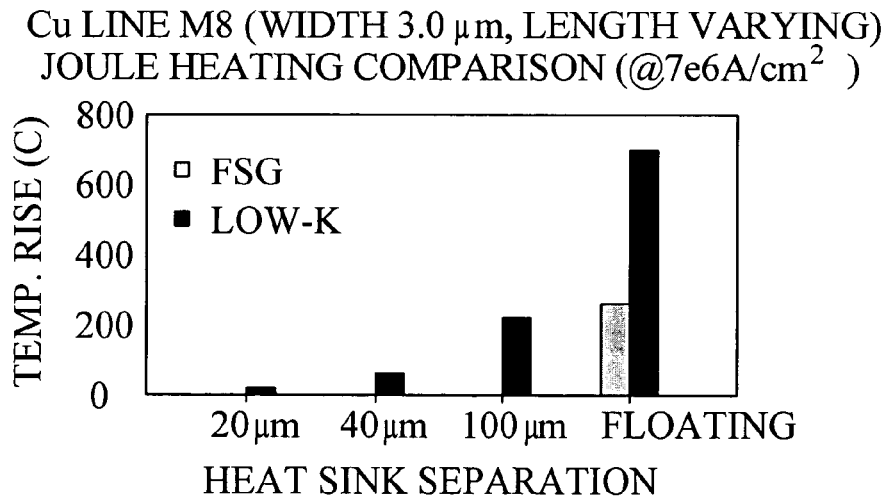

The heat sink method of reducing Joule heating is verified by simulation in FIGS. 12 and 13. Referring now to FIG. 12, simulated test structures are designed wherein n+ diffusion heat sinks are coupled to an M3 signal line. The M3 level comprises copper. Two types of dielectric material are compared. FSG, with a thermal conductivity of 1.0 W/m° K is compared to a low-k material having a thermal conductivity of 0.3 W/m° K. The heat sinks are coupled at differing distances as defined by via separation. In the most aggressive case, vias to the heat sink diffusion are spaced every 20 microns. In the most conservative case, the vias are separated by 200 microns. The closer the spacing, the greater the coupling to the heat sink and the lower the Joule heating. It is found that, for the M3 level case, a heat sink spacing of about 20 microns will cause the low-k dielectric layer to perform about as well as the FSG material. By forming many heat sinks, the thermal conductivity of the dielectric material no longer dominates the Joule heating performance. Referring now to FIG. 13, the same simulation is performed on an M8 level line. In the metal-8 case, a heat sink spacing of about 100 microns is sufficient to allow the low-k dielectric material to outperform the FSG material in Joule heating.

Referring again to FIG. 14, the metal heat sink structure 281 is illustrated in cross section. The heat sink 281 comprises a set of metal lines 270, 262, 254, 246 that are connected together to form a thermal mass. Again the first signal routing 278, ROUTING A, is analyzed by the method of the present invention. If ROUTING A exceeds the Joule heating limit, an alternative routing, ROUTING B, is generated. In this case, the only change to generate ROUTING B from ROUTING A is to couple the signal routing 278 to the metal heat sink 281. More particularly, vias 274 connect the signal routing 278 to the heat sink 281. The heat sink 281 preferably comprises a plurality of metal lines 270, 262, 254, 246 formed in the available metal levels underlying the signal route 278. The metal lines 270, 262, 254, 246 are connected together using vias 266, 258, and 248 such that the entire metal heat sink is thermally connected together.

Any of the novel methods of the present invention for reducing Joule heating may be used in the overall method 100 to improve the reliability of a signal routing as shown in FIG. 4. The method 100 may be applied to any interconnect system using multiple levels of conductive films. Traditional interconnect defined by etching metal, such as aluminum, to form metal lines can be used to form the signal routings. Alternatively, the conductive lines may be formed by a damascene process. In this case, the conductive lines may comprise copper. In such as damascene process, the dielectric layer is first deposited. Trenches are then etched into the dielectric layer where conductive lines are planned. The metal layer is then deposited conformally. A planarization step is then performed to remove excess metal and leave only metal remaining in the connective line trenches.

The present invention is especially useful for integrated circuits that use low dielectric constant value (k) dielectric layers between metal layers. Low k-value dielectrics, such as organic-based materials, offer the advantage of very low parasitic capacitance between conductive lines. However, these materials typically have a much lower thermal conductivity than inorganic dielectrics, such as fluorinate silicate glasses (FSG), that are used in older technologies. As is discussed above, the Joule heating of a signal line is inversely proportional to the k-value of the dielectric material between the conductive line and the substrate. Therefore, the method of the present invention is particularly needed to detect and correct Joule heating problems in integrated circuit featuring the organic-based, low-k dielectric materials.

Referring now to FIG. 5, a second preferred embodiment 150 of the present invention is illustrated. This embodiment expands on the concept of the first embodiment to create a method to improve the reliability of all the signal routings in an integrated circuit design. First, the integrated circuit design is generated in step 160. The layout includes all of the layers needed to define devices in, on, or above the substrate. More particularly, the layout defines a plurality of signal routings. Each signal routing comprises a configuration of metal lines in a stack of metal levels. Each metal level is separated from the underlying substrate by dielectric material. Preferably, the layout is generated using an automatic placement and routing tool.

Next, the layout is analyzed in step 164. More particularly, Joule heating estimates ($\Delta T$) are calculated for each signal routing. Once again, the Joule heating estimates preferably are based on the current density, the dielectric thickness, and the dielectric thermal conductivity. The calculated Joule heating values are then compared to the maximum temperature rise standard in step 168. If all of the routings pass the standard, then the layout passes the test and moves on to step 176. However, if any routing exceeds the Joule heating limit, then the IC layout is updated in step 172. In step 172, any signal routing that exceed the Joule heating limit is regenerated. Once again, the signal routing is updated to reduce the Joule heating value. Either of the two methods for reducing the Joule heating of a signal routing discussed above may be used. Preferably, the signal re-routing is performed by an automatic routing program.

The advantages of the present invention may now be summarized. An effective method to reduce Joule heating problems in an integrated circuit device is achieved. The method detects Joule heating problems in metal signal lines and corrects problem routings. Signal routings with Joule heating problems are corrected by re-routing signals to a lower metal level. Signal routings with Joule heating problems are corrected by coupling the signal routing to heat sink diffusions in the substrate. The use of copper and low k-value dielectric materials is facilitated. Joule heating problems can be eliminated without requiring larger metal line widths. A signal routing structure having improved Joule heating performance is achieved. The signal routing structure uses a heat sink structure to reduce Joule heating.

As shown in the preferred embodiments, the novel method and structure of the present invention provides an effective and manufacturable alternative to the prior art.

While the invention has been particularly shown and described with reference to the preferred embodiments thereof, it will be understood by those skilled in the art that various changes in form and details may be made without departing from the spirit and scope of the invention.

What is claimed is:

1. A method to optimize a signal routing in an integrated circuit comprising:
steps of
providing a signal routing in an integrated circuit layout wherein said signal routing comprises a configuration of metal lines in a stack of metal levels and wherein each said metal line is separated from an underlying substrate by dielectric material;
calculating thereafter a Joule heating estimate for said signal routing;
comparing thereafter said Joule heating estimate to a standard value;
updating thereafter said signal routing if said Joule heating estimate exceeds said standard value wherein said updating comprises generating a new configuration of said metal lines in said metal levels and wherein said new configuration reduces said Joule heating; and
repeating thereafter said steps of calculating, comparing, and updating if said Joule heating estimate still exceeds said standard value;
wherein said step of updating said signal routing comprises reducing a total volume of said dielectric material between said metal lines and said substrate.

2. The method according to claim 1 wherein said metal lines comprise copper.

3. The method according to claim 1 wherein said step of updating said signal routing is performed by an automating routing system.

4. The method according to claim 1 wherein said step of calculating a Joule heating estimate comprises a calculation based on current density in said metal lines and thermal conductivity of said dielectric material.

5. The method according to claim 1 wherein said metal lines are formed by a damascene process.

6. The method according to claim 1 wherein said step of updating said signal routing comprises coupling said metal lines to a floating diffusion region in said substrate.

7. The method according to claim 6 wherein said substrate comprises a p-type doping and said floating diffusion region comprises an n-type doping.

8. The method according to claim 1 wherein said step of updating said signal routing comprises connecting said signal routing metal lines to a metal heat sink wherein said metal heat sink comprises a set of metal lines that are connected together by vias to create a large thermal mass.

9. The method according to claim 8 wherein said set of metal lines are formed in metal levels lower than said signal routing metal lines.

10. A method to design an integrated circuit device comprising:
steps of
generating an integrated circuit layout comprising a plurality of circuit elements and signal nodes and comprising a stack of metal levels defining a plurality of signal routings between said signal nodes wherein each said signal routing comprises a configuration of metal lines in said metal levels and wherein each said metal level is separated from an underlying substrate by dielectric material;
calculating thereafter Joule heating estimates for each said signal routing;
comparing thereafter said signal routing Joule heating estimates to a standard value; and
updating thereafter said signal routings for each said signal routing where said Joule heating estimate exceeds said standard value wherein said updating comprises generating a new configuration of metal lines in said metal levels and wherein said new configurations reduce Joule heating in said signal routings; and
repeating thereafter said steps of calculating, comparing, and updating until all of said Joule heating estimates do not exceed said standard value;
wherein said step of updating said signal routings comprises reducing total volumes of said dielectric material between said metal lines and said substrate.

11. The method according to claim 10 wherein said metal lines comprise copper.

12. The method according to claim 10 wherein said steps of generating an integrated circuit layout and of updating said signal routings are performed by an automating routing system.

13. The method according to claim 10 wherein said step of calculating Joule heating estimates comprises a calculation based on current density in said metal lines and thermal conductivity of said dielectric material.

14. The method according to claim 10 wherein said metal lines are formed by a damascene process.

15. The method according to claim 10 wherein said step of updating said signal routings comprises coupling said metal lines to a floating diffusion region in said substrate.

16. The method according to claim 15 wherein said substrate comprises a p-type doping and said floating diffusion region comprises an n-type doping.

17. The method according to claim 10 wherein said step of updating said signal routing comprises connecting said signal routing metal lines to a metal heat sink wherein said metal heat sink comprises a set of metal lines that are connected together by vias to create a large thermal mass.

18. The method according to claim 17 wherein said set of metal lines are formed in metal levels lower than said signal routing metal lines.

19. A signal routing structure in an integrated circuit comprising:
a first set of metal lines in a stack of metal levels wherein said each metal level is separated from an underlying substrate by dielectric material; and a heat sink comprising a second set of metal lines coupled to said first set of metal lines by a first via or numbers of vias,
wherein the second set of metal lines are connected together by a second via or numbers of vias; and
said second set of metal lines are formed in metal levels lower than said first set of metal lines.

20. The structure according to claim 19 wherein said heat sink comprises a floating diffusion region in said substrate.

21. The structure according to claim 20 wherein said substrate comprises a p-type doping and said floating diffusion region comprises an n-type doping.

* * * * *